US00RE46914E

(19) United States
(12) Reissued Patent
Gallagher

(10) Patent Number: US RE46,914 E
(45) Date of Reissued Patent: Jun. 26, 2018

(54) BANG BOX

(71) Applicant: Brad S. Gallagher, Estero, FL (US)

(72) Inventor: Brad S. Gallagher, Estero, FL (US)

(73) Assignee: Brad Gallagher, Estero, FL (US)

(21) Appl. No.: 15/530,500

(22) Filed: Jan. 23, 2017

Related U.S. Patent Documents

Reissue of:

(64) Patent No.: 8,939,282
Issued: Jan. 27, 2015
Appl. No.: 13/669,886
Filed: Nov. 6, 2012

(51) Int. Cl.
*F42B 39/00* (2006.01)
*F42B 39/26* (2006.01)

(52) U.S. Cl.
CPC ..... *F42B 39/26* (2013.01)

(58) Field of Classification Search
CPC ..... F42B 39/26; F42B 39/00; F42B 39/14; F42B 39/18; F42B 39/22; F42B 39/24; F42B 39/30; E05G 1/00; E05G 1/02; E05G 1/024; E05G 1/026; E05G 1/04; E05G 1/12; E05G 2700/00; E05G 2700/02
See application file for complete search history.

(56) References Cited

U.S. PATENT DOCUMENTS 2,601,919 A * 7/1952 Darbyshire ..... B65D 81/05 206/3
3,757,933 A * 9/1973 Banta ..... 206/3
4,145,978 A * 3/1979 Johnson ..... E05B 65/02 109/59 R
4,148,265 A * 4/1979 Acosta ..... E05B 65/006 109/59 R
4,757,894 A * 7/1988 Schreckenstein ..... 206/3
5,133,258 A * 7/1992 Rock et al. ..... 102/331
5,158,173 A * 10/1992 Halsey et al. ..... 206/3
5,870,910 A * 2/1999 Specht ..... E05G 1/005 109/52
7,395,922 B1 * 7/2008 Sinha ..... F42B 39/26 206/3
2009/0158974 A1 * 6/2009 Smith ..... E05G 1/02 109/50
2010/0043682 A1 * 2/2010 Talmage ..... E05G 1/00 109/50

OTHER PUBLICATIONS

Explosive Storage C880 Day Box, web archive date of Dec. 23, 2010, https://web.archive.org/web/20101223073425/http://www.blasterstool.com/explosivestoragec880daybox.aspx.*
C770 Day Box, web archive date of Mar. 13, 2006, https://web.archive.org/web/20060313144211/http://www.blasterstool.com/index.asp?PageAction=VIEWPROD&ProdID=253.*
Electronic Code of Federal Regulations, Oct. 7, 2011 (date on document and web archive date of Oct. 12, 2011), https://web.archive.org/web/20111012214244/http://ecfr.gpoaccess.gov/cgi/t/text/text-idx?c=ecfr&rgn=div5&view=text&node=27:3.0.1.3.5&idno=27.*
ATF Federal Explosives Law and Regulations, 2007.*

* cited by examiner

*Primary Examiner* — Patricia Engle

(57) ABSTRACT

The invention is a compact type 3 explosive storage magazine. It has an approximate external measure of 4.75" wide, 7.87" long and 8.69" high. This design is one quarter the size of the nearest comparable type 3 magazine and has an integrated locking mechanism rather than a hinged hasp locking mechanism which is unique among type 3 magazines. The hinged hasp represents the easiest access point for theft and most likely security component to fail.

1 Claim, 4 Drawing Sheets

BANG BOX

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

Not Applicable

BACKGROUND OF THE INVENTION

A compact explosive storage magazine apparatus for storing and retrieving high and low explosives. The item was created after an extensive search for a commercially available small compact explosive storage container or magazine yielded negative results. The commercially available explosive storage containers or magazines were too large, too heavy and not feasible for use in the limited space available. The large and bulky magazines were not suited for the purpose of storing the small amounts of explosives that were set forth by ATF regulations. The commercially available options did not take the end user in mind and were created for the commercial mining and demolition field. This item was designed by and specifically for Law Enforcement personnel.

BRIEF SUMMARY OF THE INVENTION

The item was created to exceed the ATF standards under Title 27, Code of Federal Regulations (CFR) Part 555, Sub-part K, used in the construction of an approved explosive magazine. While ensuring that the standards were met or exceeded the item was made as small and as simple as possible. The item only has one moving part, the hinge, as compared to several moving parts on all commercially available options. The locking mechanism is actually built into the exterior frame of the box for added strength and simplicity. The item is approximately one forth the size of all commercially available magazines. The item has pre drilled holes to assist in mounting options and has the smallest footprint possible while still maximizing the amount of various items that could be loaded into it.

BRIEF DESCRIPTION OF THE SEVERAL VIEWS OF THE DRAWING

The computer generated sketch of the item is provided and shows several different angles. The top left picture (FIG. 1) shows the top view of the item with the hinge section being at the top and the tab section at the bottom. The top right picture (FIG. 2) shows a three dimensional view of the item with the locking tab protruding through the hole in the top section of the item. The bottom left picture (FIG. 3) shows a front side view of the item, again showing the locking tab and how the top section sides overlap the sides of the bottom section. The bottom right picture (FIG. 4), labeled section AA shows a cutaway view of the side of the item with the tab being on the left of the picture.

DETAILED DESCRIPTION OF THE INVENTION

Figure 1:
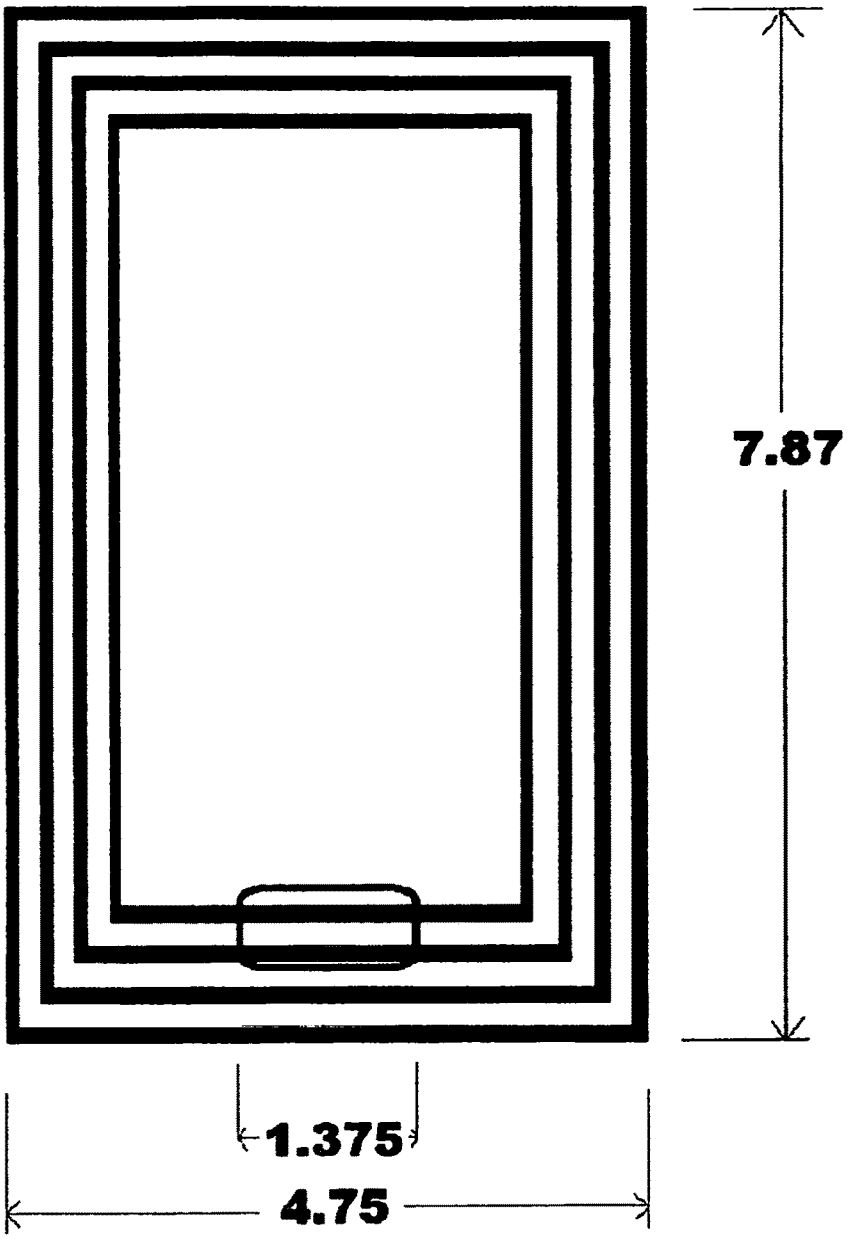
Figure 2:
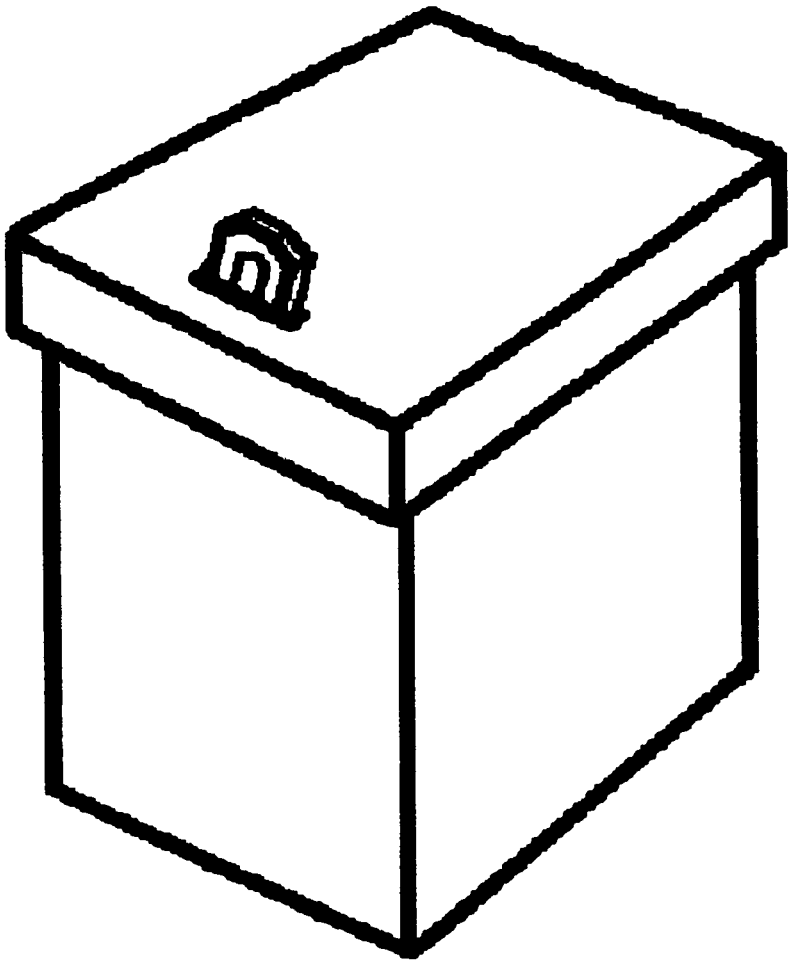
Figure 3:
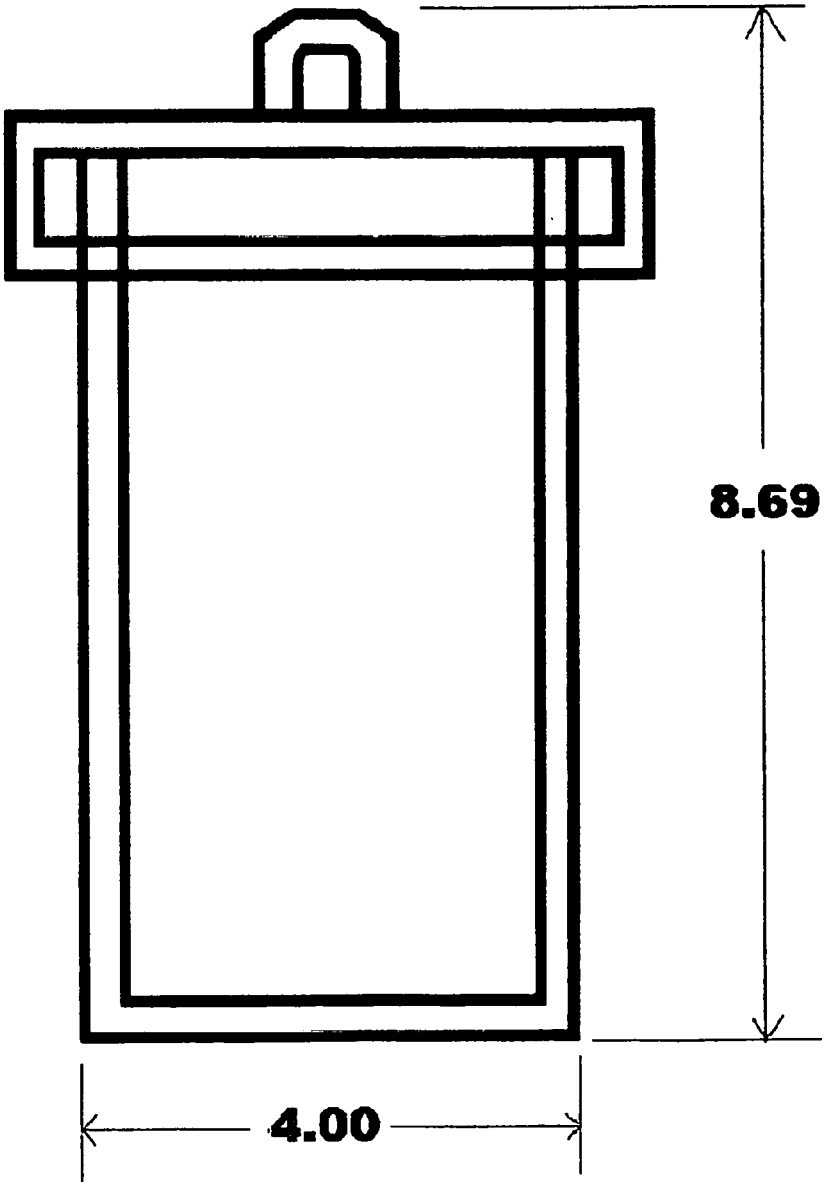
Figure 4:
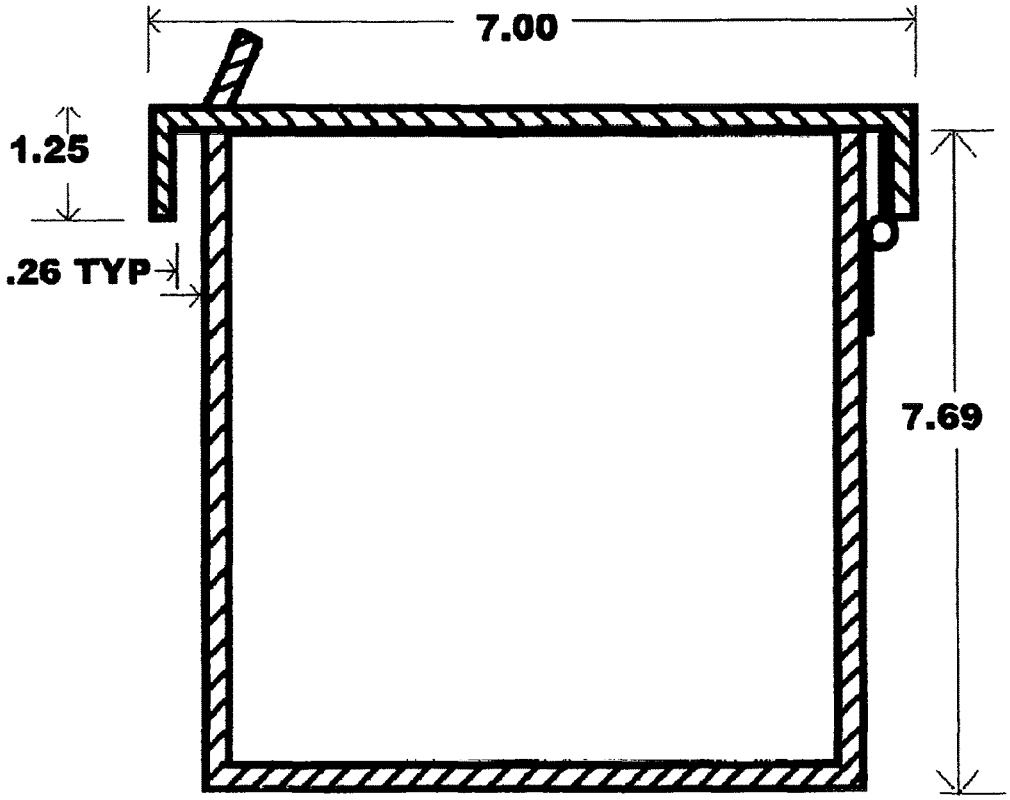

The item appears to be a metal box with lid on first appearance. It has two sections, an upper section which is slightly wider and sits on top of the lower section. They are attached to one another by a non removable pinned hinge. The hinge is welded to inside of the upper section and the outside of the lower section preventing separation. The item is custom made by laser cutting 7 gauge thick steel for construction of all metal pieces with the exception of the hinge which is bought commercially. Each section is laser cut forming the base forms. All cut sections are then attached, for example, by welding of the full penetration type to develop maximum strength and cleaned to a smooth finish forming two sections which are solid except where designed otherwise. All the following measurements are O.D. unless stated otherwise. The lower section is approximately 4.00" wide, 7.00" long and approximately 7.69" high with the exception of the front side of the lower section that contains a tab portion that extends to approximately 8.69" in total height. The tab itself is part of the front side of the lower section. The tab itself is approximately 1.00" high off the top of the front side and 1.25" wide, it is centered on the front side and angled slightly toward the center of the box. The tab contains a 0.50" wide rectangular hole by 0.625" tall with a semi rounded top inside edge to allow for clearance of the lock to be inserted into the finished product. On the bottom base of the lower section, three holes are spaced evenly apart from the front edge to the back edge and centered between both sides. The holes are pre cut to allow different mounting options of the finished item.

The upper section is approximately 4.75" wide by approximately 7.87" long. The upper section contains a rectangular hole centered directly over the front side tab. It is this rectangular hole in which the tab passes through when closed. The rectangular hole in the upper section is approximately 1.375" long by 0.4375" wide. The upper section contains overlapping sides that extend approximately 1.25" down over the lower section. All outside facing 90 degree edges of both sections are rounded to prevent snagging of equipment. The item will be powder coated inside and out. The product will be lined with mitered ⅝" (Nominal) wood on the interior forming a non sparking barrier between the exterior metal and the space within. The wood will be fixed to the metal on the top section using commercially available adhesive.

What is claimed is:

[1. A compact explosive storage magazine for storing explosives comprising:

a metal box having two sections comprising a base and lid;

the base section having a front, a back, two sides and a bottom and being approximately four inches wide by seven inches long;

the bottom of the base section includes three mounting holes spaced evenly apart from a front edge to a back edge thereof and centered between the two sides; an interior of the box lined with wood to form a non-sparking barrier;

a tab with an opening section extending upwardly from the front of the base and angled toward a center of the base;

the lid section having four sides that overlap the front, back and sides of the base section; the lid section also including a rectangular opening in the top center;

wherein the rectangular opening receives the tab of the base section to allow a locking mechanism to be held;

and wherein the base and lid section are hinged together to secure and store the explosives.]

*2. A compact portable explosive storage magazine for storing explosives comprising:*

*a metal box having two sections comprising a base and lid;*

*the base section having a front, a back, two sides and a bottom;*

*the bottom of the base section includes at least one mounting hole spaced apart from a front edge and a back edge thereof and between the two sides;*

*the lid section having four sides that overlap the front, back and sides of the base section;*

*an interior of the box lined with wood to form a non-sparking barrier, having an unattached, removable bottom section allowing access to the at least one mounting hole;*

*a two piece locking system comprised of a tab as thick as the sides on the base section and a hole on the lid section that align to accept a shackle padlock, preventing access to the interior of the box; and*

*wherein the base and lid section are hinged together to secure and store the explosives.*

* * * * *